Patented Feb. 20, 1934

1,947,498

UNITED STATES PATENT OFFICE 1,947,498

WATER PAINT

Herman A. Scholz, Oak Park, Ill., assignor to United States Gypsum Company, Chicago, Ill., a corporation of Illinois No Drawing. Application December 3, 1932
Serial No. 645,587

5 Claims. (Cl. 134—50)

This invention relates to paint, and has reference more particularly to paints which are shipped in powder form and are mixed with water at the job, these paints being suitable for application to the interior or exterior surfaces of buildings, or to the other surfaces.

In paint for application to the walls and ceilings of rooms, it has long been desired to have a material which could be shipped to the job in dry powdered form and there mixed with water to form a paint of application consistency. The ideal paint should combine the good qualities of both kalsomine and the oil type of flat wall paint; that is, it should apply easily, should level out well without brush marks, and dry with a soft sheen like kalsomine. When dry, it should not be spotted by water like kalsomine, but should approach flat wall paint in washability. A paint of this nature should apply equally well on dry surfaces or surfaces slightly moist and which otherwise are not properly cured for the best application of oil paint. It should also have superior sealing qualities so that it could be used as an undercoat under lacquer and oil type flat wall paint.

Many attempts have been made to produce a paint of this nature using casein as the binder. All the paints produced heretofore have fallen considerably short of the ideal given above, and their shortcomings were mainly due to one thing—too low a percentage of casein. They were confined to about 6% or 7% of casein, when the formulators well knew that by using double that amount a product which was greatly superior in a number of important respects could be obtained. They were obliged to keep the casein low because they did not know how to handle a high casein paint in a dry powder form. In the ordinary type of high casein formula, that is, paint containing from 10% to 15% casein on the dry basis, the following difficulties arose:

1. They were hard to mix as they worked very sticky, and a large number of hard lumps were produced.

2. A great deal of foam was formed in the mixing, which persisted in the thinned down paint, and caused complications in the application.

3. The wet paint was very transparent, so it was difficult for the painter to see how well he was covering on his application.

4. The paint was hard to apply, as it worked sticky under the brush.

5. The dried paint film was usually gritty.

6. Check cracking developed in the dried paint film where it was applied too heavily, as on low spots or runs.

7. There was a great tendency for the strong casein film to pull off a weak base, to which it had been applied, such as a paint film which was low in adhesion.

8. There was great tendency for a water paint high in casein to mold readily, often showing large areas of disfiguring dark colored mold, and in some cases decomposing to give offensive odors.

9. High casein paints ordinarily have a tendency to sag badly when applied on a smooth surface like a wall.

All these imperfections and shortcomings have in the past been sufficient to render all dry casein paints with high casein content impractical for commercial purposes. As far as I know, and I have made it a point to investigate, none of them has been successful. My preferred formula has for the first time produced a satisfactory high casein paint in dry powdered form by overcoming the above difficulties in the following manner:

1. Sticky mixing and tendency to lump were corrected by the proper combination of solvents for the casein. The lime, borax glass, and sodium fluoride are so combined that while they prevent stickiness in the mixing by not reacting with the casein too rapidly, they are sufficiently strong solvents so that they will soften up and bring into solution any lumps which may have been formed by improper or too hasty mixing. This absence of stickiness and lumping is further aided by the use of casein which has been oil treated to retard its rate of solution.

2. The tendency to foam is eliminated by the presence of sodium fluoride. The solution of this salt in the mixture seems to adjust the surface tension so that any entrained air bubbles, which have been stirred into the mixture, break when they come to the surface.

3. The wet transparency has been overcome by the presence of a titanium pigment. This has a high refractive index compared with that of the water casein solution, and consequently appears white even when being brushed on.

4. The stickiness under the brush was not corrected by any one ingredient, but was obtained by careful balancing of the fillers, the mica, and the casein solvents.

5. The absence of grit was insured by a number of expedients. In the first place, none of the insoluble constituents contained any particle sizes sufficiently large to cause grittiness. All pigments and fillers selected were of such a nature as to thoroughly disperse in the casein and solvents combination present. By using borax glass, which is anhydrous sodium borate, the danger of reaction caused by the water of crystallization of the borax and forming gritty particles was avoided.

6. Check cracking on heavy applications, and
7. Pulling on weak bases—are closely related and were corrected by the same means, which was the addition of a finely ground mica. This mica has to be fine enough so that it has no particles large enough to produce grit, and still the flakes must be of sufficient size so that they will lie in a plane parallel to the surface and thus eliminate both the tendency to check crack and to excessive pulling on weak bases.

8. Mold and bacterial decompositions were prevented by the presence of borax and sodium fluoride. If additional protection against mold is desired, particularly in damp or badly mold infested localities, this can be secured by the addition of approximately .2% of tribromophenol.

9. Sagging of the paint on a wall to form curtain-like festoons has been overcome by the adjustment of the fillers and the pigment, and in particular by the addition of the Special Velvet Filler and the fine mica.

As an example of the preferred formula for my improved paint composition, the following is given:

|  | Percent |
| --- | --- |
| Titanium pigment | 15.0 |
| Mineral filler | 19.0 |
| Special velvet filler | 39.8 |
| Casein | 12.0 |
| Mica | 5.0 |
| Borax glass | 1.1 |
| Sodium fluoride | 1.0 |
| Irish moss | .1 |
| Lime | 7.0 |
| Total | 100.0 |

Ten to thirteen gallons of water are required for 100 lbs. of dry powder to make a paint ready for use.

The titanium pigment preferred is an intimately wet mixed mixture of titanium dioxide and barium sulphate, containing about 25% of the titanium dioxide and 75% barium sulphate. Other titanium pigments may be used, such as pure titanium oxide, or various mixtures of pure titanium oxide with barium sulphate, calcium sulphate, or other inert fillers. The titanium pigment adds greatly to the opacity of the paint and increases the ability to hide or to obscure the surface to which it is applied. The titanium dioxide pigments, because of their inertness toward most chemical re-agents ordinarily encountered, are particularly adapted for use in water paints of this nature. The amount of titanium pigment present may vary between 0 to 70%, a preferred range being 5%–70%.

The mineral filler preferred is a material sold under the trade name "Metronite", and consists of a very white filler, which is composed of a mixture of tremolite, dolomite, and smaller amounts of talc, silica, calcite, etc. Metronite carries the other ingredients and at the same time, imparts considerable hiding power or opacity. It adds to the brushing and levelling qualities. It may be replaced in whole or in part by other inert fillers, such as calcium, magnesium, or barium carbonates by silicates such as kaolin, talc, or mica, by silica, by barium sulphate or calcium sulphate in their various forms, or by other fillers or similar materials, or by mixtures of any of these. The percentage of mineral filled may vary from 0 to 40%.

Special velvet filler is made from a naturally occurring mixture of a number of secondary magnesium minerals, including talc, Brucite, magnesite, and chlorite. Its exceptional fineness and plasticity makes it a valuable constituent of the paint. It imparts brushing and levelling qualities and aids materially in keeping the ready-for-use paint in suspension. It has good hiding power and permits me to decrease the percentage of the more expensive pigments, such as titanium pigment. In other words, the use of the velvet filler enables me to secure hiding property at low cost. The percentage of velvet filler may vary from 0 to 75%.

Casein acts as the binder for the paint and imparts hardness, durability, water-resistance, and sealing qualities. It is preferably coated with mineral oil or other water-repellent substances to slow up the rate of solution and lessen any tendency toward lumping. This coating of the casein is accomplished by simple mixing of mineral oil with the casein at the time of manufacture. The preferred screen analysis of the casein is:

All through 40 mesh.
Through 40 on a 100 mesh 30–45%.
Through 100 mesh 55–70%.

The proportions may be varied between 10–15%.

The mica lessens the tendency of the dried paint film to check-crack where it is applied too heavily. It decreases any pulling action, which would cause the dried paint to lift off weak bases to which it has been applied. It increases the continuity and decreases the porosity of the dried paint film so that the surface is better sealed for the application of succeeding coats of the paint itself, or of lacquers or oil paints. The mica also improves the application qualities, making the paint work more easily under the brush. The mica must be very fine, all passing a 200 mesh, and at least 97% passing a 235 mesh screen. A water-ground product is preferred, but a dry-ground mica may be used. The proportions may vary between 0% and 12%.

The borax glass is substantially anhydrous sodium borate, $Na_2B_4O_7$, prepared by driving off the water of crystallization from borax by fusing. It is very important that the borax be anhydrous, as any water of crystallization may cause certain of the ingredients present to react together in the dry mix and form gritty particles, which show up in an objectionable manner in the dried paint film. It should all pass a 200 mesh screen. Its most important function is to prevent mold growth. It also helps in the solution of the casein and in preventing the formation of lumps. The borax glass may vary from 0.5–2%. If the paint is to be marketed in the paste form the equivalent amount of borax, crystallized sodium borate ($Na_2B_4O_7.10H_2O$) may be substituted for the anhydrous salt if desired.

The main function of the sodium fluoride is to prevent the formation of lumps and of foam in the process of mixing the dried powder paint with water. Its action in this respect is very marked as it enables the user to mix the paint easily without an objectionable lumping or foaming. Sodium fluoride also assists in the solution of the casein and is a preservative and mold-preventative. Potassium fluoride may also be used. The proportions of sodium fluoride may vary from 0% to 2%.

Irish moss or chondrus prevents settling of the mixed paint. It may be replaced by pectin, agar-agar, or similar gelling agents. The amount of Irish moss used may vary from 0 to 0.5%.

The hydrated lime may be from either high calcium or dolomitic lime, a white product being preferred. It may vary from 0 to 12%. The lime acts both as a solvent for the casein, and as an insolublizer. A high calcium lime is preferred as there is less danger of its aging in the package.

It should be understood that suitable lime-proof colors or pigments may be added to the above formula to secure the desired tint or color. To increase durability and weather-resistance, drying oils, such as linseed or chinawood oil, may be added to the water-paint mixture, the oils, easily forming an emulsion. The amount and kind of oil used depends on the degree of weather-resistance desired, and to some extent, on the nature of the pigments and fillers used. The paint may be marketed as a dry powder to be mixed with water, or water and oil, prior to use. It also may be sold in semi-paste form with water alone, or with water and oil. The semi-paste may be formed by mixing the dry powder with the liquid, or if desired, by grinding through some type of paint mill after mixing.

In developing very brightly colored paint, I have worked out an alternate formula, which appears to have considerable merit, not only for interior, but also for exterior use. An example of a preferred formula of a colored paint of this nature is as follows:

| | Percent |
|---|---|
| Pigments and fillers | 74.4 |
| Mica | 10.0 |
| Casein | 12.0 |
| Borax glass | 1.1 |
| Sodium fluoride | 1.0 |
| Potassium dichromate | 1.5 |
| Total | 100 |

Water is added to the above powdered mixture in the proportion of 10 to 18 gallons of water per 100 lbs. of dry powder. Drying oil may also be added to the paint-water mixture, as in the first named formula.

The lime in this formula has been entirely eliminated, and the solution of the casein is brought about by the borax and sodium fluoride. This provision leaves the mixture only slightly alkaline and makes it possible to use colors which are not fast to lime or strong alkalis. In fact, pigments like chrome yellow (lead chromate), and iron blues (ferric ferro-cyanide) have been used without any bad results apparent after standing in the wet mix for weeks.

The potassium dichromate ($K_2Cr_2O_7$) produces a washability and resistance to weather, which appears to be equal, if not superior, to the results produced by lime. In fact, on exposure to weather, there appears to be less tendency to check-crack than when lime was used. The equivalent amount of chromate ($K_2CrO_4$) works just as well as the dichromate, and other bases such as sodium or ammonium may be substituted for potassium. Other less oxidized chromium compounds, such as chromic sulphate, ($Cr_2(SO_4)_3$) or chromic chloride ($CrCl_3$) may also be used.

For pigments, many of the pigments commonly used in paint may be used such as zinc sulphides, zinc oxides, and titanium dioxide pigments for whites, iron oxides, lead chromates, and cadmium sulphides for yellows, oranges and reds; ferro-cyanides, for blues; chromium oxides and various mixtures of blues and yellows for greens; for blacks, iron oxides and carbon pigments such as gas blacks, lamp blacks, and bone blacks may be used. Many of the organic colors, both lakes and toners, may be used to give a wide variety of brilliant shades.

The fillers, may consist of any of the fillers commonly used in paints, such as barytes, whiting, clay, talc, etc., depending upon the nature of the coloring pigment.

In the modified formula, the mica may vary from 3–15%; the casein from 6–18%; the borax glass from 0.5–2%; the sodium fluoride from 0.5–2% and the potassium dichromate from 0.25–5%. The sum of the pigments and fillers would in each case comprise the balance of the formula. The percentage range of pigment would depend upon the nature of the pigment and the amount of covering and hiding power desired. For instance, a strong pigment like a gas black or an iron blue might require 5–10%, while a white pigment, such as lithopone, might require in the neighborhood of 75%. Conversely, the fillers would vary from 0–70% depending on the nature of the pigments and of the fillers themselves.

In either the preferred formula or the modified formula it may be found desirable to add about 0.2% of tribromophenol to the dry paint mixture. The addition of the tribromophenol entirely prevents in most cases, the growth of molds of any color on the surface of the dried paint film. If any mold does grow, it is usually white and is not noticeable. Except in very severe humidity conditions, the interaction between the tribromophenol and the borax entirely prevents the formation of the molds. Instead of tribromophenol, other halogen substitution products of phenol or other compounds containing the phenol hydroxyl group, such as cresols or napthols may be used, such as sodium trichlorphenate or parachlormetacresol.

This second formula of paint may also be marketed as a dry powder to be mixed with water or water and oil prior to use. It may also be sold in semi-paste form, with water alone, or with water and oil.

I would state in conclusion that while the examples described represent practical embodiments of my invention, I do not wish to limit myself precisely to these details, since manifestly the same may be considerably varied without departing from the spirit of the invention as defined in the appended claims.

Having thus described my invention, I claim as new and desire to secure by Letters Patent:—

1. A dry powdered paint composition that on being mixed with water forms therewith a smoothly flowing liquid free from lumps and gritty particles and which composition is permanently stable when stored dry, comprising casein and anhydrous sodium borate, the latter in an amount sufficient to act as a latent solvent for the casein.

2. A dry powdered paint composition that on being mixed with water forms therewith a smoothly flowing liquid free from lumps and gritty particles and which composition is permanently stable when stored dry, comprising casein, anhydrous sodium borate in an amount sufficient to act as a latent solvent for the casein, fillers, pigments, and a casein insolubilizer from the group consisting of lime and chromium compounds.

3. A dry powdered paint composition that on being mixed with water forms therewith a smoothly flowing liquid free from lumps and gritty particles and which composition is permanently stable when stored dry, comprising casein, anhydrous sodium borate in an amount sufficient to act as a latent solvent for the casein, sodium fluoride, and a casein insolubilizer from the group consisting of lime and chromium compounds.

4. A dry powdered paint composition that on being mixed with water forms therewith a smoothly flowing liquid free from lumps and gritty particles and which composition is permanently stable when stored dry, comprising casein particles coated with a water-repellant substance, and anhydrous sodium borate, the latter in an amount sufficient to act as a latent solvent for the casein.

5. A dry powdered paint composition that on being mixed with water forms therewith a smoothly flowing liquid free from lumps and gritty particles and which composition is permanently stable when stored dry, comprising casein particles coated with oil, and anhydrous sodium borate, the latter in an amount sufficient to act as a latent solvent for the casein.

HERMAN A. SCHOLZ.